United States Patent Office 3,250,787
Patented May 10, 1966

3,250,787
ALKYLTHIO THIOPHENES
Walter Reifschneider, Midland, Mich., assignor to The Dow Chemical Company, Midland, Mich., a corporation of Delaware
No Drawing. Filed June 27, 1962, Ser. No. 205,536
1 Claim. (Cl. 260—329)

The present invention is directed to thioethers and in particular is directed to novel thioethers corresponding to the formula

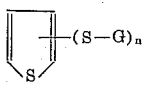

In the present specification and claims, G represents an alkyl group containing from 2 to 24, inclusive, carbon atoms, or a cycloalkyl group, and $n$ is an integer from 2 to 4, inclusive.

The novel compounds are colorless to light colored liquids or crystalline solids, very slightly soluble in water but readily soluble in various common organic solvents such as lower alkanols, benzene and the like. In impure form many of them appear as tarry substances; these substances characteristically exhibit useful properties characteristic of the highly purified products. The compounds are useful as pesticides and herbicides; various of them are selective fish poisons: as inhibitors of the germination of fungus spores, they are effective fungistats. The compounds are also useful as additives to improve the properties of lubricating oils especially designed for operation under high pressures and temperatures; they are useful as intermediates in the preparation of dyestuffs and biologically active materials; they are also of value as solvent additives in the modification of behavior of mixed solvent systems.

The compounds are prepared in a process which comprises the steps of causing a reaction between a halothiophene compound corresponding to the formula

wherein X represents halogen, and a mercaptan compound corresponding to the formula

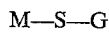

M—S—G where M represents hydrogen, an alkali metal, or cuprous copper. During the reaction to prepare the present compounds, $n$ molecules of mercaptan react with each molecule of halothiophene. Small amounts of mercaptan may be lost in side reactions. Thus, when it is desired to prepare the present compounds in a high state of purity and with a minimum of post-synthesis purification procedure, the starting reactants should be employed in equimolecular proportions, or preferably, with the mercaptan in slight excess. However, other proportions may be employed if desired, and unconsumed starting material of whatever identity may, if desired, be recycled into further synthesis process.

The reaction goes forward at temperatures over a wide range, such as from 20° to 350° C., but initiates most readily when heated to a temperature somewhat higher than room temperature, preferably from 100° C. to 250° C. Under these conditions the reaction is, in general, exothermic and goes forward to completion with good yield calculated upon the basis of consumed starting material. When mercaptan is employed, hydrogen halide of reaction is evolved and means for its orderly disposal are advantageously provided.

Typically, in the preparation of the compounds of the present invention, reaction between the mercaptan starting material and the halothiophene starting material will initiate and go forward only when there is employed a catalytic amount of both a source of cuprous ion and nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed amount is not critical, but may vary from a very small trace amount, less than $\frac{1}{100}$ of 1 molar percent, to as much as an amount equimolecular with either reactant or even greater. In general, the employment of larger amounts is accomplished by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as an aliphatic or aromatic hydrocarbon.

It is preferred and, in certain preparations apparently critical, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the preesnt invention, the halothiophene and the mercaptan are intimately mixed and blended, in any order and in desired amounts, with source of cuprous ion and nitrogenous base as hereinbefore described, and thereafter heated, to a temperature at which reaction takes place promptly. In one convenient method of practicing the present method, the reaction temperature may be the boiling temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. In any event the reaction product is extracted with solvent, the solvent extract dried over an inert drying agent such as, for example, anhydrous potassium carbonate or the like; the solvent vaporized and removed and the remaining product distilled if desired: or if solid, chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—2,5-bis(ethylthio)thiophene*

A reaction mixture is prepared, consisting of 24.2 grams (0.1 mole) of 2,5-dibromothiophene, 16 grams of cuprous oxide (technical grade) and 13 grams (approximately 0.21 mole) of ethyl mercaptan dispersed in a mixture consisting of 110 milliliters quinoline and 10 milliliters pyridine. The resulting reaction mixture is placed in a flask under reflux, the reflux being equipped with a water trap. In this situation, the reaction mixture is heated at its reflux temperature (a pot temperature between approximately 200° and 240° C.) for 4 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over anhydrous potassium carbonate which also neutralized remaining traces of acidic substances; the resulting liquid is warmed to vaporize and remove ether solvent and obtain a residual oil. This oil is distilled at gradually increasing temperatures and under declining subatmospheric pressures to obtain a 2,5-bis(ethylthio)thiophene product as a colorless liquid boiling at 119–121° C. under pressure of 3.0 millimeters mercury absolute.

The product is useful as a piscicide. The median lethal dose for Northern Fat Headed Minnow free-swimming in a body of natural water is about 1 part per million parts by weight of water. At this rate it is essentially harmless to aquatic and littoral plant life. Also, the use of a thorough wetting spray containing, as sole protective agent, ten parts of the compound of the present example per million parts by weight of resulting aqueous dispersion proved quite effective in the destruction of germinant ascospores of *Monilinia fructicola*.

Employing 2,3,4,5-tetrabromothiophene and four molecular proportions of isopropyl mercaptan, in procedures of this example, there is obtained a 2,3,4,5-tetrakis(isopropylthio)thiophene product as a crystalline solid. It is useful as a wholly combustible fuel alcohol denaturant.

*Example II.—2,5-bis-(n-butylthio)thiophene*

In procedures essentially similar to those of the foregoing example except that the starting mercaptan employed in an amount approximately twice equimolecular with the dibromothiophene in n-butyl mercaptan, there is prepared, in good yield, 2,5-bis(n-butylthio)thiophene as a yellow oil soluble in 95 percent ethanol acetane and xylene and of low solubility in water, boiling at 154–156° C. under 2 millimeters pressure, absolute. It is an insecticide and fungicide when employed as sole protective agent to destroy germinant urediniospores of wheat stem rust.

In similar procedures employing 2,5-dichlorothiophene and a commercial dodecyl mercaptan of predominantly linear structure there is obtained a 2,5-bis(dodecylthio)thiophene.

*Example III.—3,4-bis(cyclohexylthio)thiophene*

A reaction mixture is prepared consisting of 24.2 grams (0.1 mole) 3,4-dibromothiophene, 7.2 grams technical cuprous oxide, 24 grams (approximately 0.2 mole) cyclohexanethiol dispersed together in 130 milliliters technical 2,4-lutidine and 60 milliliters quinoline, as mixed liquid reaction medium. The resulting reaction mixture is heated, with stirring, at its boiling temperature and under reflux overnight (approximately 15 hours), the reflux condenser being equipped with a water separator. At the conclusion of the reaction time, the resulting hot mixture is poured directly into a mixture of chipped ice and 200 milliliters concentrated hydrochloric acid. As a result of these procedures, the ice melts and a pale brown solid separates in the resulting aqueous dispersion. This solid is collected by filtration and a chloroform extract made of it. The chloroform extract is washed twice with 10 percent hydrochloric acid and then dried over anhydrous potassium carbonate. From the resulting dry chloroform solution, chloroform solvent is evaporated, leaving a white solid which is recrystallized from methanol to obtain white crystals of 3,4-bis(cyclohexylthio)thiophene. As a fungicide the compound gives control of various plant disease fungi.

*Example IV.—2,5-bis(tetracosylthio)thiophene*

A reaction mixture is prepared consisting essentially of 36.8 grams (0.1 mole) of tetracosyl mercaptan, 14.8 grams (0.05 mole) of 2,5-diiodothiophene and 1 gram cuprous bromide dispersed together in 200 milliliters mixed technical xylidines as hydrogen halide acceptor, catalyst, and liquid reaction medium. The resulting reaction mixture is heated for approximately 18 hours, at its boiling temperature and under reflux and with stirring, to carry the reaction to completion. At the conclusion of the reaction time, the resulting hot mixture is poured directly into a mixture of chipped ice together with 250 milliliters concentrated hydrochloric acid. As a result of these procedures, the ice melts and a dark solid separates in the resulting aqueous dispersion. This solid is collected by filtration and a benzene extract thereof prepared, washed twice with 10 percent hydrochloric acid and dried over potassium carbonate. From the resulting dry benzene solution, benzene solvent is heated and vaporized to obtain a light-colored solid which is recrystallized from isopropanol to obtain white crystals of 2,5-bis(tetracosylthio)thiophene which is a solid at room temperature and has a molecular weight of approximately 817.2. In the pure form, the product is practically odorless.

*Example V.—2,5-bis(ethylthio)-3,4-bis(cyclohexylthio)-thiophene*

The present synthesis takes advantage of the greater reactivity, in the present synthetic procedures, of a bromine substituent upon thiophene, than a chlorine substituent. In a mixture of 130 mililiters technical 2,4-lutidine and 60 milliliters quinoline, as mixed liquid reaction medium, are dispersed 23 grams (0.2 mole) 2,5-dibromo-3,4-dichlorothiophene and 49.8 grams (0.4 mole) of the cuprous salt of ethyl mercaptan. The resulting reaction mixture is heated, with stirring, at its boiling temperature and under reflux for 2 hours. Thereafter, there is added 31.5 grams (0.2 mole) of cyclohexanethiol, as heating and stirring are continued. At the conclusion of the reaction time, the resulting hot mixture is poured directly into a mixture of chipped ice and 200 milliliters concentrated hydrochloric acid. As a result of these procedures, the ice melts and a solid separates in the resulting aqueous dispersion. This solid is collected by filtration and a chloroform extract made of it. The chloroform extract is washed twice with hydrochloric acid and then dried over anhydrous potassium carbonate From the resulting dry chloroform solution, chloroform solvent is evaporated, leaving a white product solid which is recrystallized from methanol to obtain off-white crystals of 2,5-bis(ethylthio) - 3,4 - bis(cyclohexylthio)-thiophene having the structural formula

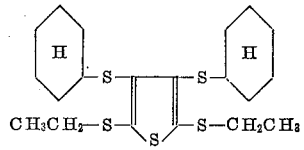

By employing the different reactivities of the different halogen substituents upon thiophene, and by using there-with predetermined molar amounts of reactants, it is possible to direct a predetermined mercaptan substituent to any predetermined ring carbon atom of the thiophene nucleus. For this purpose, the reactivity of the halogens follows the order of their molecular weight.

In procedures essentially the same as the foregoing, by the use of appropriate starting materials, other products of the present invention are prepared as follows:

From 2,3-dichlorothiophene and an excess above 2 molecular proportions of n-hexylmercaptan, in the presence of cuprous oxide and in liquid lutidine-quinoline mixture, 2,3-bis(n-hexylthio)thiophene.

From 3,4-diiodothiophene and 2 molecular proportions of n-octylmercaptan, in the presence of cuprous lactate and in a propanol solution of secondary n-butylamine, 3,4-bis(n-octylthio)thiophene.

From 2,3,4-trichlorothiophene and a moderate excess above 3 molecular proportions of decylmercaptan (mixed isomers, predominantly normal), in the presence of cuprous phosphate and in liquid N,N-dipentylxylidene, 2,3,4-tris(decylthio)thiophene.

From 2,3-dichloro-4-bromothiophene and, firstly, 1 molecular proportion of cyclohexylmercaptan and, secondly, a moderate excess over 2 molecular proportions of normal hexylmercaptan, in the presence of ammoniacal cuprous sulfate and aniline, 4-cyclohexylthio-2,3-bis-(n-hexylthio)thiophene.

From 3-fluorothiophene and a slight molar excess of n-octylmercaptan, in a liquid lutidine-quinoline mixture in the presence of cuprous fluoride, a 3-(n-octylthio)thiophene.

The mercaptans necessary as starting materials in the practice of the present invention are, for the most part, articles of commerce. However, those which are not can readily be prepared in known procedures such as, for example, the method of Pieverling. See Liebig's Annallen der Chemie, volume 183, pages 344–359, note especially page 349 and following. Other methods are well known to those skilled in the art.

The halogenated thiophenes to be employed as starting materials are of known types. Many of them are listed in the Beilstein's Handbuch Der Organischen Chemie, band XVII, pages 29–36 (1910) and the references therein cited. They are in general made by direct halogenation, with regard for the known preferential order of halogenated sites of the unhalogenated or partly halogenated thiophene structure.

The cuprous salts of mercaptans are easily prepared from the corresponding mercaptan by reaction with a copper source which may be metallic copper, or a copper oxide or hydroxide or halide. The mercaptan and copper source are combined in the presence of at least a minor catalytic amount of nitrogenous base, and, optionally, an inert liquid reaction medium. Advantageously the resulting reaction mixture is heated to hasten the reaction. When employing a liquid nitrogenous base material such as collidine, lutidine, picoline and the like, adequate quantities of such material may constitute liquid reaction medium.

Because the reaction of the cuprous mercaptide liberates copper in a form in which it readily combines with further mercaptan only small catalytic amounts of copper need be employed and they may be employed to prepare the needed cuprous aromatic thiolate in situ.

When employing a mercaptan under conditions under which it would be normally be volatile, it is conventionally handled in techniques appropriate for the utilization of a reactant gas. Thus, for example, methyl mercaptan and ethyl mercaptan are introduced into reaction sites as reactants through an introduction tube of which the opening is substantially below the surface of a reaction medium. Alternatively, their non-volatile salts may be used. Those skilled in synthetic chemistry will naturally observe such considerations for the nature of the reactants employed.

I claim:

2,5-bis(ethylthio)-3,4-bis(cyclohexylthio)thiophene.

References Cited by the Examiner

UNITED STATES PATENTS 2,870,163   1/1959   Davis et al. _____ 260—329

OTHER REFERENCES

Gol'dfarb et al., Zhur Obshchei Khim., vol. 29, pages 2034–42 (1959).

WALTER A. MODANCE, *Primary Examiner.*

JOHN D. RANDOLPH, *Examiner.*

J. T. MILLER, JAMES A. PATTEN,
*Assistant Examiners.*